US005906381A

United States Patent [19]

Hovatter

[11] Patent Number: 5,906,381

[45] Date of Patent: May 25, 1999

[54] TOOL STORAGE AND TRANSPORT SYSTEM

[76] Inventor: Steven Hovatter, Route 5, Box 263, Leakesville, Miss. 39451

[21] Appl. No.: 08/821,861

[22] Filed: Mar. 21, 1997

[51] Int. Cl.$^{6}$ .............................................. B62B 1/00

[52] U.S. Cl. .................................... 280/47.18; 280/47.27

[58] Field of Search .............................. 280/47.29, 47.18, 280/47.131, 47.17, 47.24, 47.27, 47.26, 47.28, 35, 79.2, 130; 248/129, 133; 211/49.1, 194; 206/349, 386, 486, 487, 493, 596, 598, 595

[56] References Cited

U.S. PATENT DOCUMENTS

| | | | |
|---|---|---|---|
| 2,964,328 | 12/1960 | Muir | 280/47.19 |
| 4,457,527 | 7/1984 | Lowery | 280/47.19 |
| 4,743,038 | 5/1988 | Myers | 280/40 |
| 5,031,926 | 7/1991 | Wannamaker | 280/47.2 |
| 5,213,351 | 5/1993 | Chen | 280/47.19 |
| 5,240,264 | 8/1993 | Williams | 280/40 |
| 5,269,545 | 12/1993 | Huebschen et al. | 280/47.35 |
| 5,465,987 | 11/1995 | Dellavecchia | 280/47.28 |

*Primary Examiner*—Robert J. Oberleitner
*Assistant Examiner*—C. T. Bartz
*Attorney, Agent, or Firm*—Joseph N. Breaux

[57] ABSTRACT

A tool storage and transport system that includes a tool storage box assembly secured to a removable dolly assembly. The tool storage box assembly includes a number of attachment bolts extending outwardly from a back wall of the tool storage box assembly, a like number of fastener nuts threadable onto the threaded ends of the attachment bolts, a lifting plate receiving slot formed into the bottom of the tool storage box assembly, a removable multi-outlet power strip secured partially within a channel formed into the tool storage box assembly, and a magnetic cover surface secured to an upper surface of the tool storage box assembly. The removable dolly assembly includes a pair of vertical supports, having a number of storage box securing apertures and spaced therealong a manner to allow the attachment bolts of the tool storage box to be inserted therethrough, and a lifting plate secured between the vertical supports and sized to fit within the lifting plate receiving slot of the tool storage box assembly.

16 Claims, 3 Drawing Sheets

TOOL STORAGE AND TRANSPORT SYSTEM

TECHNICAL FIELD

The present invention relates to storage and transport systems and more particularly to a storage and transport system for tools that includes a tool storage box assembly secured to a removable dolly assembly wherein the tool storage box assembly includes a number of attachment bolts extending outwardly from a back wall of the tool storage box assembly, a like number of fastener nuts threadable onto the threaded ends of the attachment bolts, a lifting plate receiving slot formed into the bottom of the tool storage box assembly, a removable multi-outlet power strip secured partially within a channel formed into the tool storage box assembly, and a magnetic cover surface secured to an upper surface of the tool storage box assembly; and wherein the removable dolly assembly includes a pair of vertical supports having a number of storage box securing apertures spaced therealong in a manner to allow the attachment bolts of the tool storage box to be inserted therethrough, and a lifting plate secured between the vertical supports and sized to fit within the lifting plate receiving slot of the tool storage box assembly.

BACKGROUND OF THE INVENTION

It is often necessary for a worker to transport an extensive number of tools and parts to a location to perform a required job. It would be a benefit to these individuals to have a transport system to transport theses items to the required location. In addition, because the items must often be transported to the job site each morning and removed each evening, it would be a benefit, if the transport system could also be used as a storage system. Because one of the items required to perform the job can be a dolly, it would be a benefit to have a tool storage and transport system that included a dolly that was detachable from a tool storage box assembly and which could be used as a conventional dolly at the work site.

In addition, because the job can require dismantling assemblies including a number of metal parts and fasteners in windy and other inclimate conditions, it would be a tremendous benefit to have a surface that would hold and attract the removed parts sufficiently to prevent rolling away of blowing of the parts until reassembly can be accomplished.

SUMMARY OF THE INVENTION

It is thus an object of the invention to provide a tool transport system.

It is a further object of the invention to provide a tool storage and transport system.

It is a still further object of the invention to provide a tool storage and transport system that includes a dolly that is detachable from a tool storage box assembly and which can be used as a conventional dolly at the work site.

It is a still further object of the invention to provide a tool storage and transport system that includes a holding and attracting surface thereon for holding metal parts, fasteners, etc.

It is a still further object of the invention to provide a tool storage and transport system that includes a tool storage box assembly secured to a removable dolly assembly wherein the tool storage box assembly includes a number of attachment bolts extending outwardly from a back wall of the tool storage box assembly, a like number of fastener nuts threadable onto the threaded ends of the attachment bolts, a lifting plate receiving slot formed into the bottom of the tool storage box assembly, a removable multi-outlet power strip secured partially within a channel formed into the tool storage box assembly, and a magnetic cover surface secured to an upper surface of the tool storage box assembly; and wherein the removable dolly assembly includes a pair of vertical supports having a number of storage box securing apertures spaced therealong in a manner to allow the attachment bolts of the tool storage box to be inserted therethrough and a lifting plate secured between the vertical supports and sized to fit within the lifting plate receiving slot of the tool storage box assembly.

It is a still further object of the invention to provide a tool storage and transport system that some or all of the above objects in combination.

Accordingly, a tool storage and transport system is provided. The tool storage and transport system includes a tool storage box assembly and a dolly assembly that is removably attachable to the tool storage box assembly. The tool storage box assembly includes a storage container housing that defines a first plurality of storage container compartments and a lifting plate receiving slot. The lifting plate receiving slot is formed into a bottom portion of the storage container housing and is sized to receive a portion of the dolly assembly when the dolly assembly and tool storage box assembly are secured together. The tool storage box assembly also includes a second plurality of storage containers each positionable within one of the first plurality of storage container compartments, a third plurality of attachment bolts extending outwardly from a back wall of the storage container housing, a fourth plurality of fastener nuts threadable onto threaded ends of the third plurality of attachment bolts, a removable multi-outlet power strip secured partially within a channel formed into the storage container housing, and a magnetic cover surface secured to an upper surface of the storage container housing.

The dolly assembly is removably attachable to the tool storage box assembly and including a pair of vertical supports and a lifting plate secured between the vertical supports and sized to fit within the lifting plate receiving slot of the tool storage box assembly. The vertical supports include a number of storage box securing apertures spaced therealong in a manner to allow the attachment bolts of the tool storage box assembly to be inserted therethrough. Once the attachment bolts have been inserted through the storage box securing apertures, the fastener nuts are threaded onto threaded ends of the attachment bolts to secure the dolly assembly and the tool storage box assembly together.

BRIEF DESCRIPTION OF DRAWINGS

For a further understanding of the nature and objects of the present invention, reference should be made to the following detailed description, taken in conjunction with the accompanying drawings, in which like elements are given the same or analogous reference numbers and wherein.

DESCRIPTION OF THE EXEMPLARY EMBODIMENT

Figure 1:
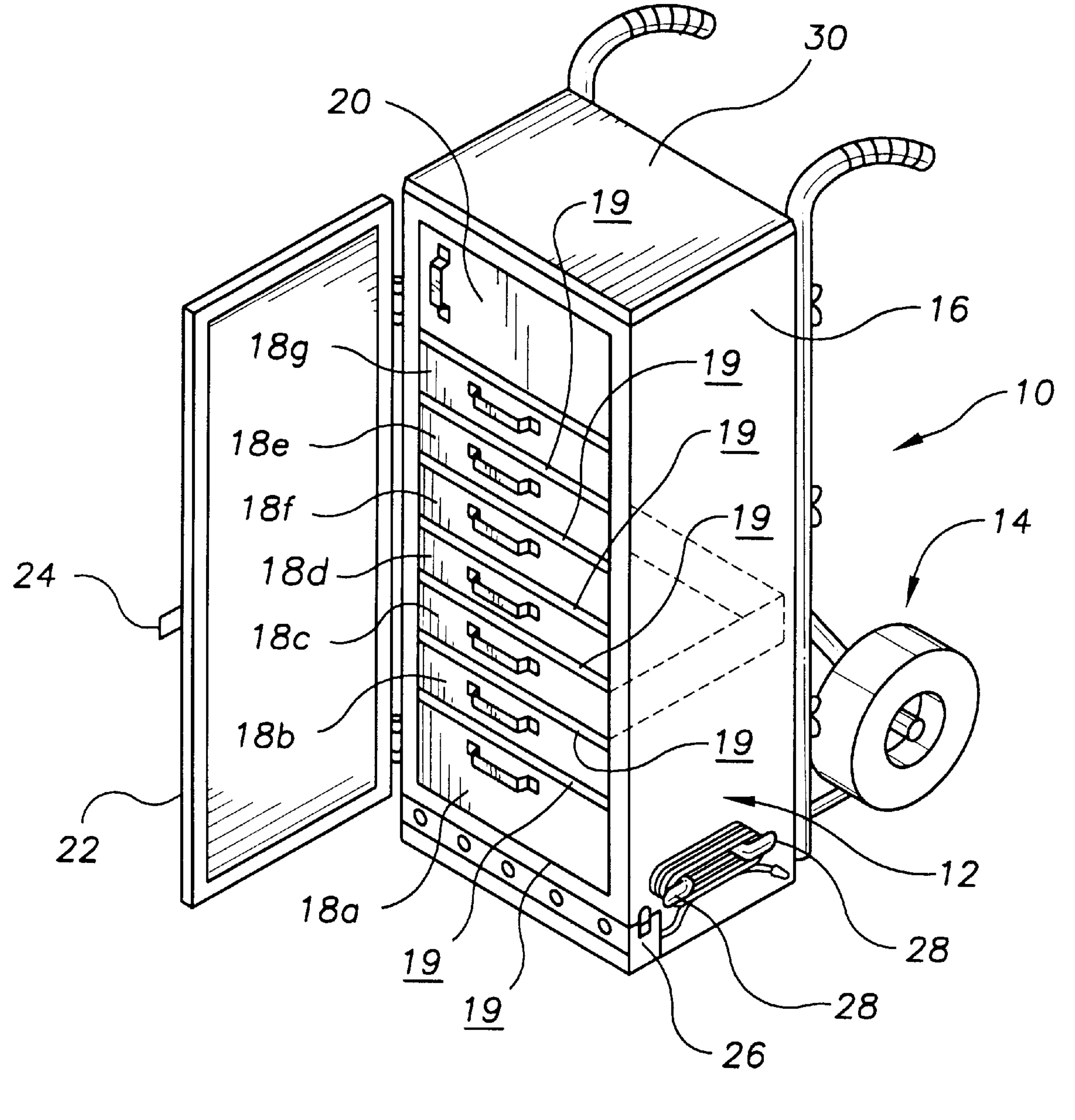
FIG. 1 is a perspective view of an exemplary embodiment of the tool storage and transport system of the present invention showing the tool storage box assembly secured to the removable dolly assembly showing the storage container housing, the removable storage containers, the securing door, the removable power strip, the extension cord winding posts, the hinged cover door with securing hasp, and the magnetic tool and part holding cover surface secured to the top of the storage container housing.

FIG. 1 shows an exemplary embodiment of the tool storage and transport system of the present invention generally designated by the numeral 10. Tool storage and transport system 10 includes a tool storage box assembly, generally designated by the numeral 12, and a removable dolly assembly, generally designated by the numeral 14.

Figure 2:
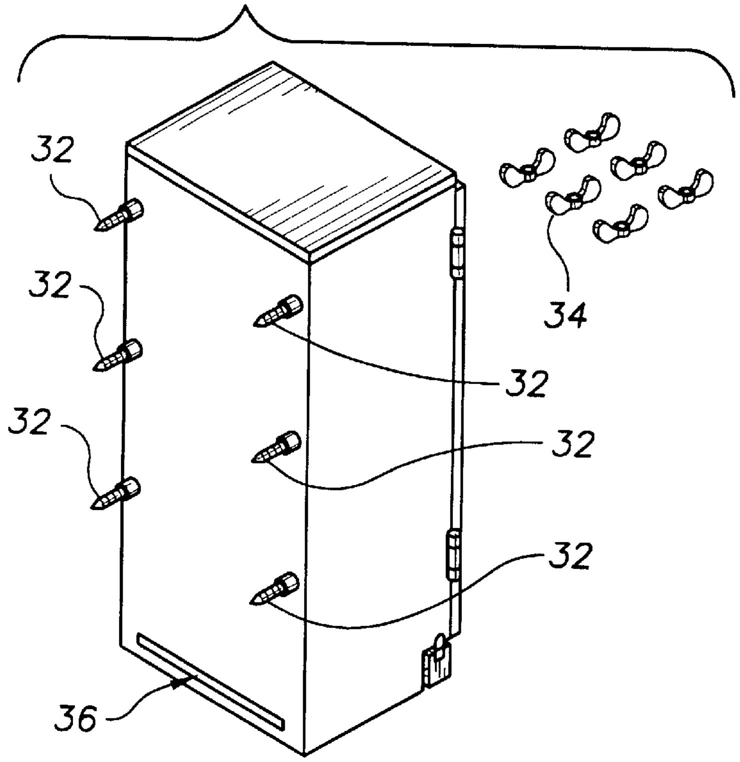
FIG. 2 is a perspective view of the back of the tool storage box assembly showing the six attachment bolts extending outwardly from the storage box back wall, the lifting plate receiving slot opening formed into the bottom of the storage box back wall, and six wing nuts that are threadable onto the six attachment bolts.
Figure 3:
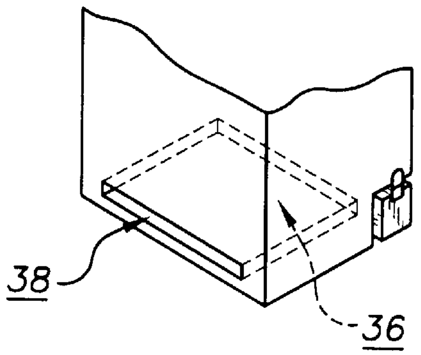
FIG. 3 is a detail perspective view of the back of the storage box assembly showing the lifting plate receiving slot and the lifting plate receiving slot opening.

Tool storage box assembly 12 includes a storage container housing 16, seven removable storage containers 18*a–g* each inserted within a storage container compartment 19, a hinged storage compartment 20, a hinged securing door 22, a locking hasp 24, a removable power strip 26, a pair of extension cord winding posts 28, a magnetic tool and part holding cover surface 30, and (with reference now to FIG. 2) six identical attachment bolts 32, six identical wing nuts 34, and a lifting plate receiving slot 36 (more clearly shown in FIG. 3) accessible through a receiving slot opening 38.

Figure 4:
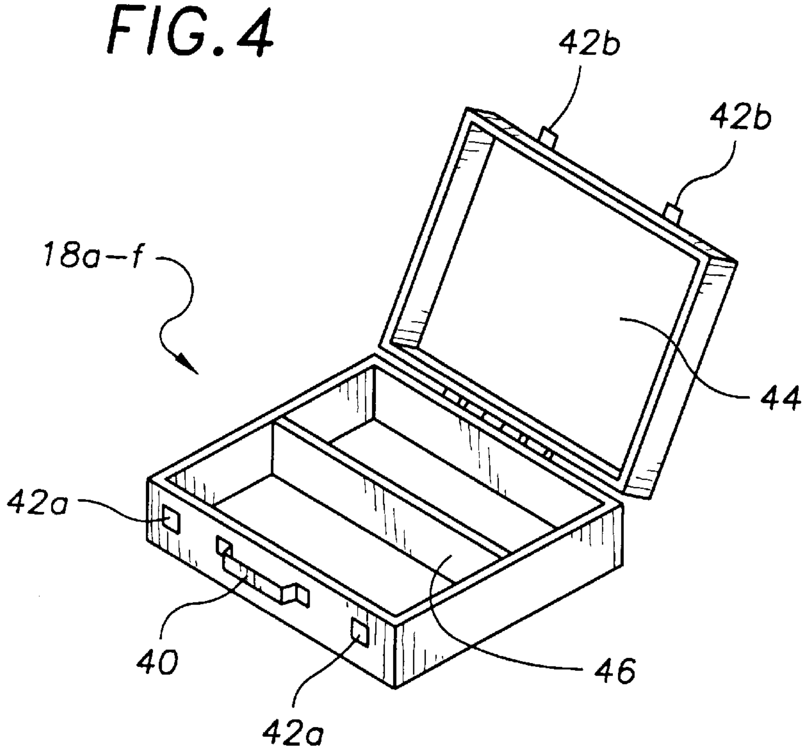
FIG. 4 is a perspective view of one of the removable storage boxes of the storage box assembly of FIG. 1 showing the handle, the pivoting cover and the removable compartment divider.

With reference back to FIG. 1, storage container housing 16, removable storage containers 18*a–g*, hinged storage compartment 20, hinged securing door 22, locking hasp 24, extension cord winding costs 28, and attachment bolts 32 and wing nuts 34 (FIG. 2) are of conventional metal construction. Magnetic tool and part holding cover surface 30 is a one-half inch thick section of flexible, rubberized magnetic material. Referring to FIG. 4, each storage container 18*a–f* includes a handle 40, a pair of locking fixtures 42*a*,42*b*, a container cover 44, and a container partition for partitioning a storage compartment 48.

Figure 5:
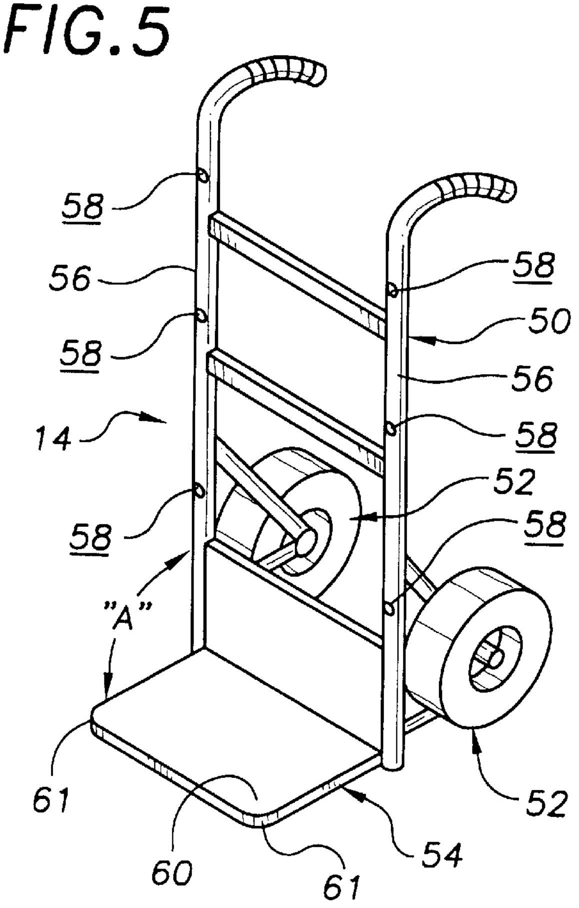
FIG. 5 is a perspective view of the dolly assembly of the tool storage and transport system of the present invention showing the six storage box securing apertures formed through the vertical supports and the lifting plate.

FIG. 5 shows exemplary dolly assembly 14 in isolation. Dolly assembly 14 is of conventional construction and includes a frame assembly 50, two wheel assemblies 52, and a lifting assembly 54. In this embodiment, frame assembly 50 includes a pair of vertical supports 56 each having three storage box securing apertures 58 drilled therethrough. Lifting assembly 54 includes a flat, metal lifting plate 60 having rounded corners 61. Lifting plate 60 is oriented at an angle "A" of ninety degrees with respect to vertical supports 56. In use, lifting plate 60 is positioned within lifting plate receiving slot 36 when attachment bolts 32 (FIG. 2) are inserted through storage box securing apertures 58 and secured in place with wind nuts 34.

It can be seen from the preceding description that a tool storage and transport system has been provided that includes a dolly that is detachable from a tool storage box assembly and which can be used as a conventional dolly at the work site; that includes a holding and attracting surface thereon for holding metal parts, fasteners, etc.; and that includes a tool storage box assembly secured to a removable dolly assembly wherein the tool storage box assembly includes a number of attachment bolts extending outwardly from a back wall of the tool storage box assembly, a like number of fastener nuts threadable onto the threaded ends of the attachment bolts, a lifting plate receiving slot formed into the bottom of the tool storage box assembly, a removable multi-outlet power strip secured partially within a channel formed into the tool storage box assembly, and a magnetic cover surface secured to an upper surface of the tool storage box assembly; and wherein the removable dolly assembly includes a pair of vertical supports having a number of storage box securing apertures spaced therealong in a manner to allow the attachment bolts of the tool storage box to be inserted therethrough and a lifting plate secured between the vertical supports and sized to fit within the lifting plate receiving slot of the tool storage box assembly.

It is noted that the embodiment of the tool storage and transport system described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A tool storage and transport system comprising:

a tool storage box assembly having a storage container housing that defines a first plurality of storage container compartments and a lifting plate receiving slot, said lifting plate receiving slot being formed into a bottom portion of said storage container housing, a second plurality of storage containers each positionable within one of said first plurality of storage container compartments, a third plurality of attachment bolts extending outwardly from a back wall of said storage container housing, a fourth plurality of fastener nuts threadable onto threaded ends of said third plurality of attachment bolts, a removable multi-outlet power strip secured partially within a channel formed into said storage container housing, and a magnetic cover surface secured to an upper surface of said storage container housing; and a dolly assembly removably attachable to said tool storage box assembly, said dolly assembly including a pair of vertical supports having a number of storage box securing apertures spaced therealong in a manner to allow said attachment bolts of said tool storage box assembly to be inserted therethrough and a lifting plate secured between said vertical supports and sized to fit within said lifting plate receiving slot of said tool storage box assembly.

2. The tool storage and transport system of claim 1, wherein:

said magnetic cover surface is a one-half inch thick section of flexible, rubberized magnetic material.

3. The tool storage and transport system of claim 1 wherein:

said dolly assembly includes a flat, metal lifting plate having rounded corners.

4. The tool storage and transport system of claim 1, wherein:

said lifting plate is oriented at an angle of ninety degrees with respect to said vertical supports.

5. The tool storage and transport system of claim 1, wherein:

said dolly assembly and said storage box assembly are securable together in a manner such that said lifting plate is positioned within said lifting plate receiving slot when said third plurality of attachment bolts are inserted through said number of storage box securing apertures and said fourth plurality of fastener nuts is threaded onto said threaded ends of said third plurality of attachment bolts.

6. The tool storage and transport system of claim 2 wherein:

said dolly assembly includes a flat, metal lifting plate having rounded corners.

7. The tool storage and transport system of claim 2, wherein:

said lifting plate is oriented at an angle of ninety degrees with respect to said vertical supports.

8. The tool storage and transport system of claim 2, wherein:

said dolly assembly and said storage box assembly are securable together in a manner such that said lifting plate is positioned within said lifting plate receiving slot when said third plurality of attachment bolts are inserted through said number of storage box securing apertures and said fourth plurality of fastener nuts is threaded onto said threaded ends of said third plurality of attachment bolts.

9. The tool storage and transport system of claim 6, wherein:

said lifting plate is oriented at an angle of ninety degrees with respect to said vertical supports.

10. The tool storage and transport system of claim 6, wherein:

said doily assembly and said storage box assembly are securable together in a manner such that said lifting plate is positioned within said lifting plate receiving slot when said third plurality of attachment bolts are inserted through said number of storage box securing apertures and said fourth plurality of fastener nuts is threaded onto said threaded ends of said third plurality of attachment bolts.

11. The tool storage and transport system of claim 9, wherein:

said dolly assembly and said storage box assembly are securable together in a manner such that said lifting plate is positioned within said lifting plate receiving slot when said third plurality of attachment bolts are inserted through said number of storage box securing apertures and said fourth plurality of fastener nuts is threaded onto said threaded ends of said third plurality of attachment bolts.

12. The tool storage and transport system of claim 7, wherein:

said dolly assembly and said storage box assembly are securable together in a manner such that said lifting plate is positioned within said lifting plate receiving slot when said third plurality of attachment bolts are inserted through said number of storage box securing apertures and said fourth plurality of fastener nuts is threaded onto said threaded ends of said third plurality of attachment bolts.

13. The tool storage and transport system of claim 3, wherein:

said lifting plate is oriented at an angle of ninety degrees with respect to said vertical supports.

14. The tool storage and transport system of claim 3, wherein:

said dolly assembly and said storage box assembly are securable together in a manner such that said lifting plate is positioned within said lifting plate receiving slot when said third plurality of attachment bolts are inserted through said number of storage box securing apertures and said fourth plurality of fastener nuts is threaded onto said threaded ends of said third plurality of attachment bolts.

15. The tool storage and transport system of claim 13, wherein:

said dolly assembly and said storage box assembly are securable together in a manner such that said lifting plate is positioned within said lifting plate receiving slot when said third plurality of attachment bolts are inserted through said number of storage box securing apertures and said fourth plurality of fastener nuts is threaded onto said threaded ends of said third plurality of attachment bolts.

16. The tool storage and transport system of claim 4, wherein:

said dolly assembly and said storage box assembly are securable together in a manner such that said lifting plate is positioned within said lifting plate receiving slot when said third plurality of attachment bolts are inserted through said number of storage box securing apertures and said fourth plurality of fastener nuts is threaded onto said threaded ends of said third plurality of attachment bolts.

* * * * *